United States Patent [19]

Kessens et al.

[11] 4,193,250
[45] Mar. 18, 1980

[54] HEIGHT CONTROL FOR MULTI-ROW CROP HARVESTER

[75] Inventors: Norman J. Kessens; Marvin L. Joray, both of Celina, Ohio

[73] Assignee: Paul Revere Corporation, Coldwater, Ohio

[21] Appl. No.: 964,705

[22] Filed: Nov. 29, 1978

[51] Int. Cl.² ..................... A01D 67/00; A01D 75/14
[52] U.S. Cl. ........................................ 56/208; 56/314; 56/DIG. 15
[58] Field of Search ................ 56/10.2, DIG. 15, 208, 56/314

[56] References Cited

U.S. PATENT DOCUMENTS

| | | | |
|---|---|---|---|
| 2,473,655 | 6/1949 | Lohn | 56/DIG. 15 |
| 2,660,015 | 11/1953 | Briscoe | 56/DIG. 15 |
| 3,851,451 | 12/1974 | Agness et al. | 56/208 |
| 3,975,890 | 8/1976 | Rodger | 56/208 |
| 4,124,970 | 11/1978 | Bernhardt | 56/10.2 |
| 4,136,508 | 1/1979 | Coleman et al. | 56/208 |

FOREIGN PATENT DOCUMENTS

| | | | |
|---|---|---|---|
| 2461115 | 6/1976 | Fed. Rep. of Germany | 56/10.2 |
| 384196 | 6/1970 | U.S.S.R. | 56/10.2 |

Primary Examiner—Louis G. Mancene
Assistant Examiner—Paul J. Hirsch
Attorney, Agent, or Firm—Robert J. McNair, Jr.; Abraham Ogman

[57] ABSTRACT

Apparatus is disclosed which provides automatic height control for the header of a multi-row crop harvester. The crop processing header has a series of row dividers hinge mounted along its front edge. Under at least two of the row dividers is a ground engaging wheel which causes the leading edge of each to float up and down as the terrain changes. Servo actuating sensors mounted between the divider and the header respond to changes in the angle of attack therebetween. The servo system actuates hydraulic valves allowing oil pressure to automatically raise and lower the header. This means of height control maintains the cutter bar or ear stripper plates a predetermined distance above ground regardless of changes in terrain.

8 Claims, 6 Drawing Figures

HEIGHT CONTROL FOR MULTI-ROW CROP HARVESTER

BACKGROUND OF THE INVENTION

Self propelled combines and forage harvesters usually include means for either cutting stalk crops close to the ground or snapping the ears off standing corn. Basic working components of the harvester are the thresher or crop processor and a header unit mounted transversely at the front thereof. The header unit contains the cutter bar or snapping rolls, the means for centrally grouping the crop and an elevator assembly for delivering the plants or selected portions thereof to the thresher or processor.

Arrayed across the front of the header unit are a number of row dividers. For example, if the header is designed for harvesting four rows of corn simultaneously, there would be 5 row dividers spaced at equal intervals across the front of the header. The row dividers serve to pick up bent stalks, lifting and steering them into the harvesting machinery.

Many different harvesters have been built for gathering row crops. Most of them require close attention by the machine operator, who must not only steer down the rows but also manually adjust the height of the header above the ever changing terrain contours. As harvesting machines were made bigger so they could process more rows simultaneously and at the same time move through the field at a faster pace, the burden on the machine operator became increasingly difficult when trying to handle everything by manual control.

Applicant found that the harvesting job could be accomplished easier and more efficiently if automatic header height control were incorporated. To do this, sensors were incorporated which make electrical contact to control solenoid valves which direct a hydraulic system to automatically change header height to maintain it within a desired float range above ground.

SUMMARY OF THE INVENTION

An object of this invention is to eliminate the need for the harvesting machine operator to have to continuously adjust his height control lever as he progresses across the field. In implementing my invention, at least two of the row divider units are instrumented as height control sensors. One of the two divider units will be on the left side of the machine center, the other on the right side. The sensors function independently to raise the crop header when either side of the assembly gets too close to the ground. The sensors work together when directing the hydraulic system to lower the header with respect to ground. By this is meant that both sensors have to signify that all is clear for lowering the header before action occurs.

Placement of the sensor devices in the row dividers accomplishes two things. First, the tips of the dividers are the most forward extending part of the harvester, hence can be used to properly sense changes in terrain before the main part of the harvester gets there. Second, by pivotal or hinge mounting of each divider along the front edge of the header, a sensor can be instrumented to monitor the angular relationship between the divider and header.

The sensor assembly comprises the following. A ground engaging wheel is rotatably mounted under and near the front of the row divider. The wheel axle is adjustable up or down at preselectable positions to accommodate varying crop conditions, since the adjustment allows the roll height of the front tip of the divider to be pre-established. The lower rear edge of the row divider is pivotally mounted to the lower front edge of the header. With this arrangement, the front tip of the divider moves up and down with respect to the header as the ground engaging wheel encounters changes in ground terrain. A mechanical linkage having one end mounted on the frame assembly of the divider and the other end mounted on the frame of the header, responds to changes in angular position of the row divider with respect to the header. Raising of the tip of the divider with respect to the header beyond a certain amount causes the linkage to actuate an electrical contact which generates an up-command. Lowering the tip of the row divider with respect to the header beyond a specified value causes the linkage to actuate a second electrical contact which generates a down-command. The closing of either of the electrical contacts results in actuation of solenoid valves which regulate the flow of hydraulic fluid to the lift cylinders which position the header with respect to crop processor unit on which it is mounted.

Since the header contains either the cutoff knife bar or the ear stripping rollers, use of my invention to control the height of the header results in positive control of crop harvesting operation. Use of two ground sensors, one on the left end of the header and one on the right assures that neither end of the header gouges into the ground even under side-hill operating conditions. The left and right sensors are interconnected such that an up-command from either serves to raise the header. However, both sensors must be calling for a down-command before the hydraulic system is actuated to lower the header.

IN THE DRAWINGS

The invention is illustrated by way of example in the accompanying drawings, in which.

DESCRIPTION OF THE PREFERRED EMBODIMENT

Figure 1:
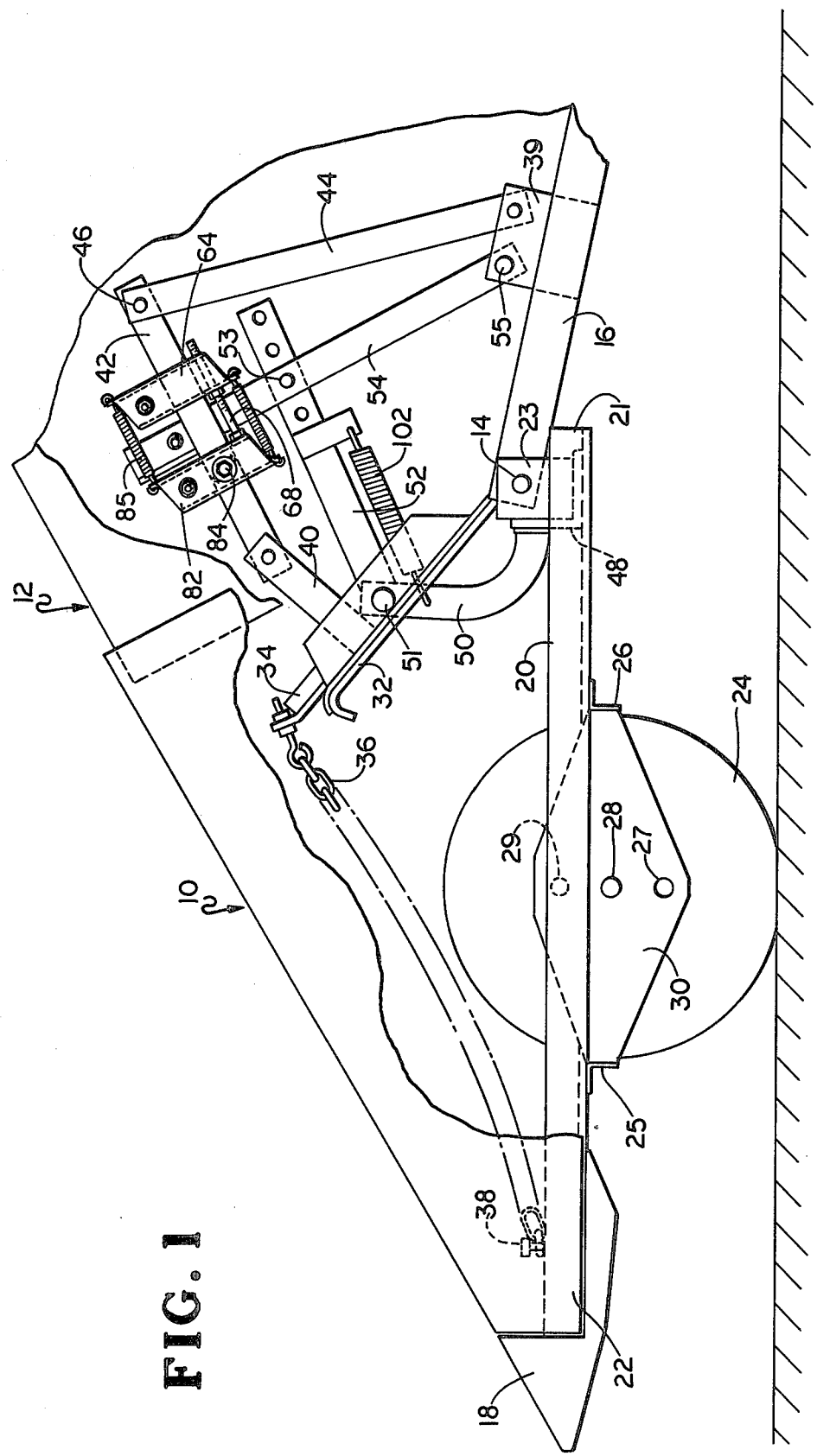
FIG. 1 is a partially cutaway view of a row divider pivotally mounted to the front of a header. The mechanical linkages shown sense changes in relative position between the divider and the header.

Referring to FIG. 1 there is shown a row divider 10 mounted at the lower front edge of header 12 by pivotal mount 14. It will be understood that frame member 16 is part of header 12. Row divider 10 includes a tip 18 attached to the front end of a short A-frame 20. The A-shape configuration will be seen when the assembly is viewed in the vertical plane. When viewed as shown in FIG. 1, this means that end 21 of frame 20 is nearer to the viewer than is end 22. End 21 and its companion member on the far side pivotally mount to the header by means of tabs 23 which may be attached to frame 20 as by welding. Rotatably mounted near the middle of A-frame 20 is a wheel 24 which in the unit reduced to practice was of the pneumatic tired variety. A pair of angle brackets 25 and 26 attached across the side arms of the A-frame allow the wheel 24 to be centered in any one of three vertically positioned holes 27, 28, or 29 formed in wheel sideplate 30. It will be understood that any type of ground engaging member would function the same. This includes implementation with skid shoes. The goal is to maintain the center of A-frame 20 a specified distance above ground level.

Across the rear of row divider 10 is a rectangular subframe assembly 32 which is rigidly positioned with respect to header 12 and header frame member 16. Attached to the top center of rectangular frame member 32 is a bracket 34 to which is attached by means of an adjustable eye-bolt, one end of limit chain 36. The other end of limit chain 36 is attached to the tip end of A-frame 20 by means of stud 38. Chain 36 limits the depression angle that the front of divider 10 can drop below the header.

Mounted fixedly between rectangular frame member 32 and header frame standoff bracket 39 are support bracket 40, contact support 42 and brace 44. Brace 44 in the unit reduced to practice was a single piece. However, in some implementations it may comprise two like members, one behind the other which form a tripod base arrangement to provide a more rigid support at fastener 46.

Angle bracket cross support 48, an integral part of divider frame member 20, has rigidly attached thereto, one end of arm 50. The other end of arm 50 is attached to one end of following bar 52 by means of pin 51. The second end of following bar 52 has several spaced holes therethrough, one of which is pinned by bolt 53 to a midregion point of actuator bar 54. The bottom end of actuator bar 54 is rotatably anchored to standoff bracket 39 by bolt 55.

With the FIG. 1 arrangement, raising the tip 18 of divider 10 with respect to ground causes actuator bar 54 to move clockwise around bolt 55. Lowering the tip of divider 10 with respect to ground causes actuator bar 54 to turn counterclockwise.

Figure 2:
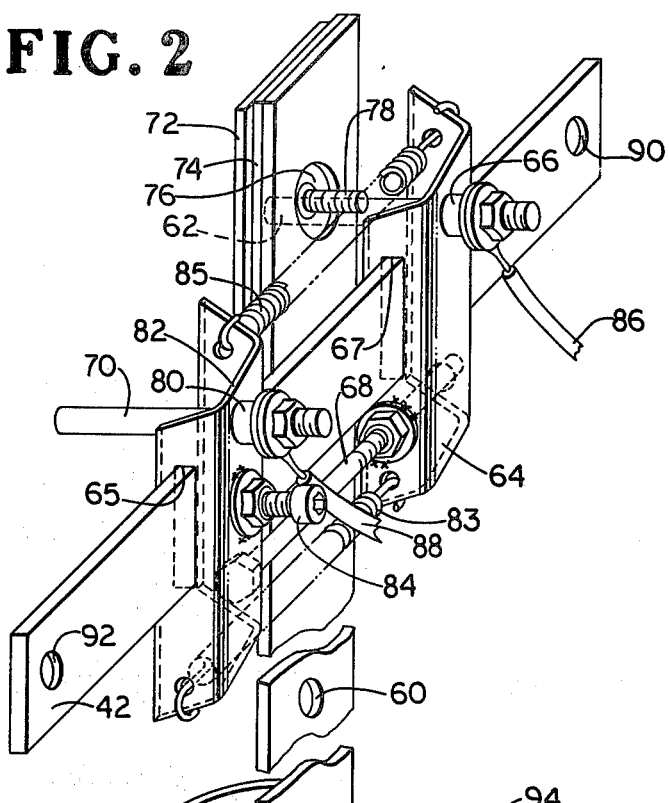
FIG. 2 shows an isometric view of the sensor subassembly which includes the movable arm and the circuit completing electrodes.

The function performed when actuator bar 54 rotates clockwise or counterclockwise can be seen by referring to FIG. 2. There, like parts carry the same numbers as they did in FIG. 1. Actuator bar 54 is pivotally mounted at its lower end where hole 56 allows the bar to be attached by bolt 55 to bracket 39 (See FIG. 1). The backside of bar 54 is reinforced by a section of welded tubing 58 so that bar 54 will better rotate about bolt 55 in a single plane. Midway up bar 54 is a hole 60 which allows attachment of following bar 52 by means of bolt 53. It is by means of bolt 53 (See FIG. 1) that bar 54 is pushed back and forth around the center of bolt 55.

Pushing and pulling of bar 54 causes the top end to slide along contact support 42. As bar 54 turns clockwise it eventually makes contact with first electrode 62. First electrode 62 extends outwardly from channel support 64. Insulator 66 electrically isolates first electrode 62 from channel support 64. Channel support 64 has a rectangular opening 67 therethrough which allows it to be slidingly attached to contact support 42.

When bar 54 is rotated in a counterclockwise direction, contact is made with second electrode 70. Second electrode 70 extends outwardly from but is electrically isolated from channel support 82. Channel support 82 is configured similar to channel support 64, having an elongated slot 65 therethrough. The slot allows channel support 82 to be slidingly attached to contact support 42. Stud 84 provides a means for locking channel support 82 to a specific location on contact support 42. A standoff stud 68 in combination with top spring 85 and bottom spring 83 allows the position of first electrode 62 to be established with reference to second electrode 70.

As may be seen in FIG. 1, chain 36 limits how far bar 54 can rotate in the counterclockwise direction. The location at which chain 36 begins to become taut will establish the position of channel support 82 on contact support 42 at which stud 84 is locked down.

There is no specific limit which stops the header in the clockwise direction of rotation. This means that bar 54 will sometimes move clockwise more than at other times. Allowing channel support 64 to slide back and forth on contact support 42 accommodates these variations. Use of springs 83 and 85 in combination with an adjustable standoff stud 68 establishes the initial conditions for bar 54 to make contact with first electrode 62.

When bar 54 is rotated in a counterclockwise direction, the first part of bar 54 to approach second electrode 70 is plate contactor 72. Plate contactor 72 is cemented to one side of insulating plate 74, the other side of insulating plate 74 being cemented to the end of actuator bar 54 as shown in FIG. 2. The leading edge of plate contactor 72 extends beyond the edge of actuator bar 54 such that only plate contactor 72 makes contact with second electrode 70. Rotation of bar 54 in the clockwise direction brings only the main bar 54 in contact with first electrode 62. This is due to the fact that plate contactor 72 does not extend all the way to the far edge of bar 54. Opening 76 through bar 54 allows post 78 to make electrical connection with plate contactor 72.

Insulator 80 allows second electrode 70 to be electrically isolated from channel support 82. Conductors 86 and 88 carry electrical energy to first electrode 62 and second electrode 70 respectively. Rotation of bar 54 in a clockwise direction until contact with first electrode 62 causes the electrical signal on conductor 86 to be grounded since the lower end of bar 54 is secured to the header frame. Rotation of bar 54 in a counterclockwise direction until contact with second electrode 70 is made transfers the electrical potential on conductor 88 to post 78. A conductor attached to post 78 can then convey the information to the signalling control system.

Figure 3:
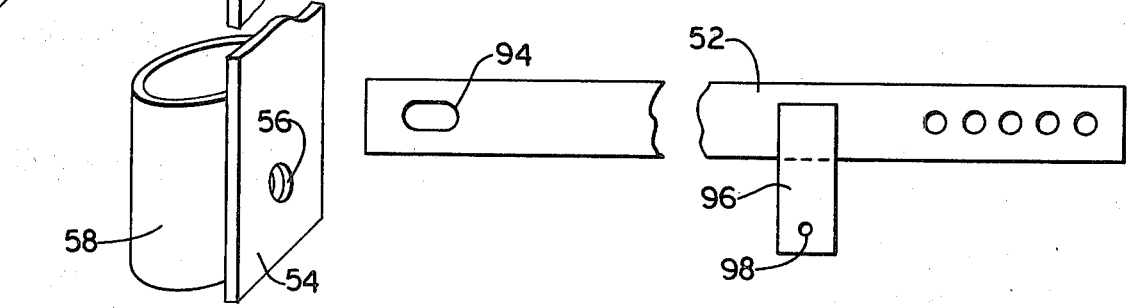
FIGS. 3, 4 and 5 show views of the two linkage arms which translate relative up-down motion of the divider to actuation of the movable arm shown in FIG. 2.
Figure 4:
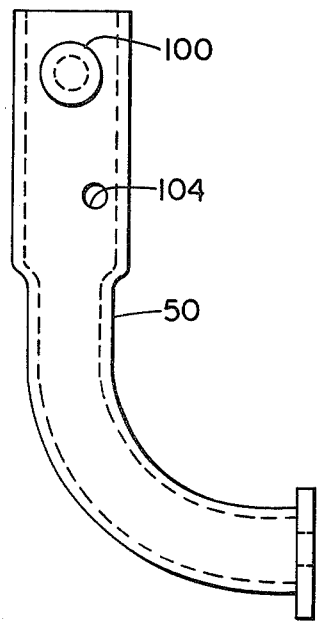
Figure 5:
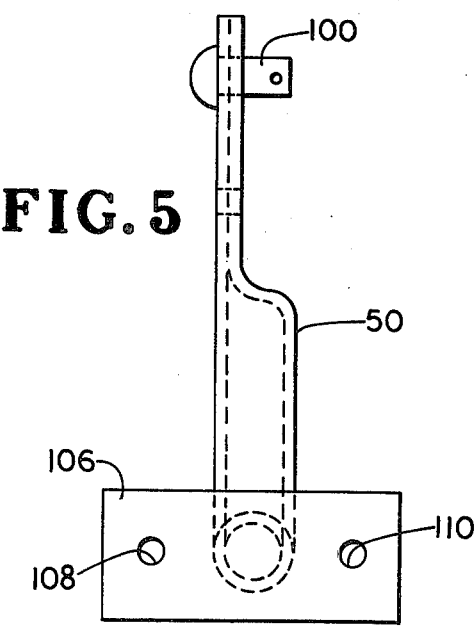

FIGS. 3, 4 and 5 show the features of arm 50 and following bar 52 in more detail. Following bar 52 has in addition to a number of selectable holes in the end attached to actuator bar 54 (See FIG. 1), an elongated opening 94 in its second end. Elongated opening 94 functions in conjunction with bracket 96 and opening 98, therethrough. Stud 100, attached in the top end of arm 50 inserts through elongated opening 94 in the arrangement shown in FIG. 1. Spring 102 connected from opening 104 in arm 50 to opening 98 in bracket 96 draws stud 100 to the right hand end of elongated opening 94. A cotter pin and washer arrangement (not shown) will keep arm 50 secured to the end of following bar 52. The elongated slot and spring arrangement provides for some stress release when the actuator bar makes contact with the second electrode 70.

The configuration of arm 50 depicted in FIGS. 4 and 5 shows one means of making the assembly sturdy. Crossplate 106 on the bottom end of arm 50 allows rigid attachment of arm 50 to angle bracket cross support 48 by means of bolts inserted in holes 108 and 110.

Figure 6:
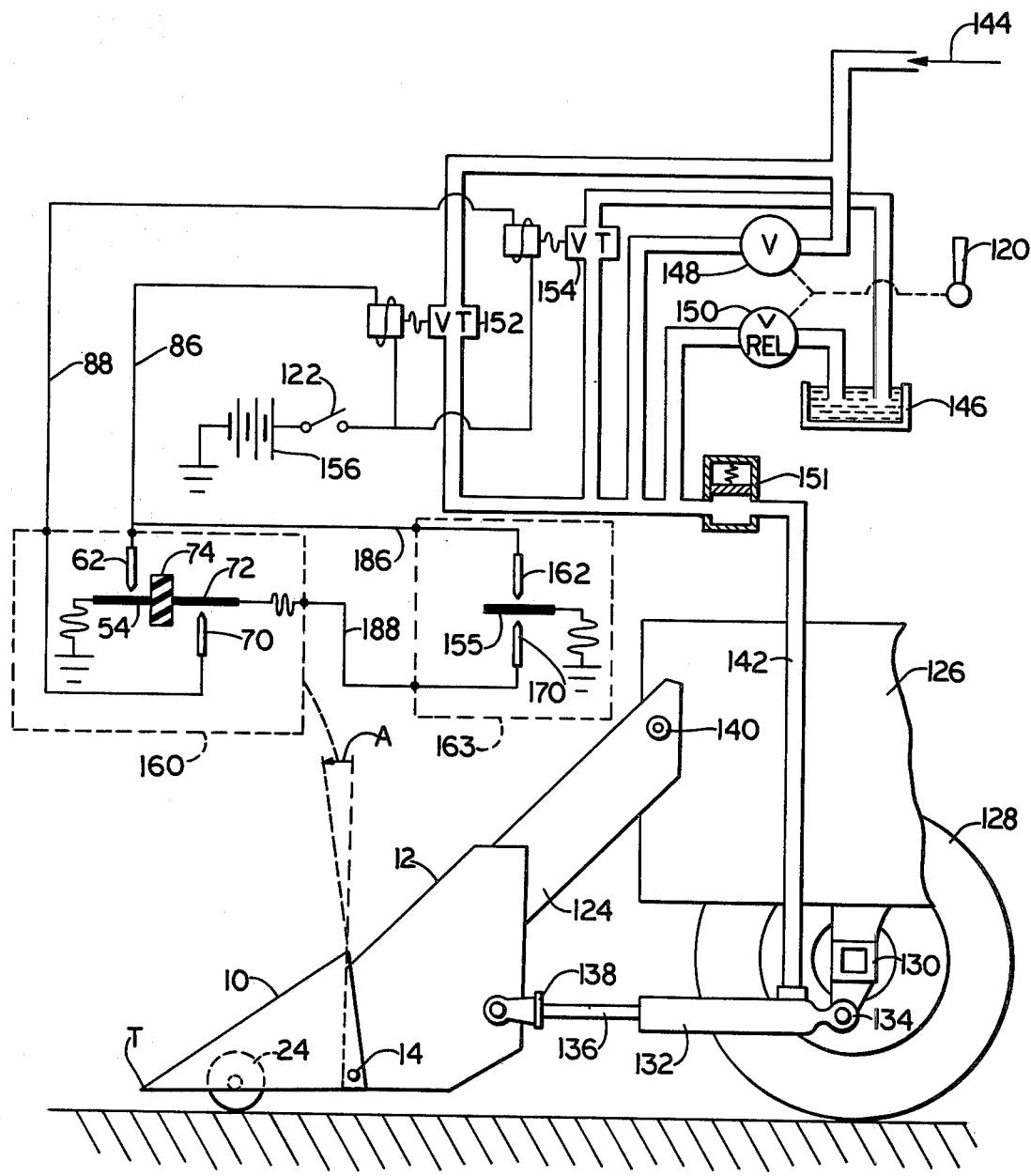
FIG. 6 is a schematic diagram, partially in pictoral form, of the entire header height control system.

FIG. 6 shows a schematic of the combined hydraulic and electrical servo system which is employed for elevational control of header 12. With the system shown manual override of the automatic height control is provided. Manual control is provided by operator manipulation of control lever 120. Automatic control is enabled by closure of switch 122.

Functionally, the row crop harvester of FIG. 6 consists of two or more row dividers 10 mounted on the front transverse header 12. The header will include a cutting bar if its purpose is to harvest the entire stalk. Alternately, the header will include the snapping roll mechanism if its purpose is to harvest the ears from a corn crop. Whatever the purpose of the header, its harvested result is delivered up elevator assembly 124 into the self propelled crop processor or combine 126. Locomotion for combine 126 is provided by drive wheel 128 and its near side companion, not shown. From mounting axle 130 of drive wheel 128 there is suspended hydraulic cylinder 132. At its rear end, hydraulic cylinder 132 is pivotly mounted via pin 134. The piston actuated extendable shaft 136 of hydraulic cylinder 132 is insertably positioned in bell housing 138 which extends from the rear side of header 12. Extension of extendable shaft 136 lifts the header 12 by causing it to rotate forward around elevator pivot point 140. It is to be noted that the FIG. 6 embodiment is depicted for functional simplicity and that in reality there are two hydraulic cylinders 132 and two bell housings 138, one on either side of elevator assembly 124.

Application of fluid pressure through supply line 142 serves to extend the piston of hydraulic cylinder 132. A decrease in pressure at supply line 142 brings about the lowering of header 12. The supply of pressurized fluid to operate the hydraulic equipment enters at 144, from a source which may be the hydraulic pump on the combine. With manual control, the operator uses lever 120 to open valve 148, allowing oil to flow in from supply 144. This increases the amount of oil in line 142, forcing header 12 further away from axle 130. Turning lever 120 in the opposite direction opens pressure release valve 150 resulting in the drainage of oil from cylinder 132 into sump 146.

Pressure accumulator 151 functions to smooth out the response due to traversing uneven terrain as well as the bumps and jolts experienced in driving across normal farm fields.

In the automatic mode with switch 122 closed, battery 156 is used to operate electrical solenoid valves 152 and 154. One end of battery 156 is grounded; the positive terminal of the battery is encircuited, via switch 122, with solenoid valves 152 and 154.

The components within the dashed line enclosure 160 are the same as those described in conjunction with FIG. 2. Like elements have been given the same numbers. It will be understood that the components within dashed line 160 are physically at the interface between divider 10 and header 12. Lifting the divider tip (T) decreases angle (A) shown graphically in FIG. 6. As previously explained, raising divider tip (T) causes actuator bar 54 to move upward until it makes contact with first electrode 62. Contact between actuator bar 54 and first electrode 62 serves to ground conductor 86. This completes the electrical circuit through electrical solenoid valve 152, causing the valve to open so that fluid can flow from supply 144 into hydraulic cylinder 132 and bring about an application of force to bell housing 138. The result is the raising of the header away from ground level. Once solenoid valve 152 is actuated the height of the header will continue to rise until such time as the angle (A) between divider 10 and header 12 increases to the point that the actuator bar 54 separates from first electrode 62.

If the tip of the divider 10 drops with respect to the header 12, angle (A) increases causing the actuator bar to move forward toward the second electrode 70. The actuator bar itself does not make contact with the second electrode. Rather, it is the leading edge of plate contactor 72 which contacts second electrode 70. Insulating plate 74 separates actuator bar 54 and plate contactor 72.

Contact between second electrode 70 and plate contactor 72 does not complete the circuit for electrical solenoid 154. The "down" circuit can only be completed via the components within the dashed line enclosure 163.

The components within dashed line enclosure 163 are physically mounted in a second row divider. If it is assumed that the components within dashed line enclosure 160 are located in the left most divider on the header, then the components within dashed line enclosure 163 might be in the right hand most divider. The physical arrangement of the dashed line enclosure 163 components is exactly the same as the layouts shown in FIGS. 1, 2, 3, 4 and 5 with the exception that actuator bar 54 would not have plate contactor 72 and plate insulator 74 cemented to its upper end. For this reason, the second divider components are designated as plain actuator bar 155, third electrode 162 and fourth electrode 170.

If the tips of both first and second dividers are depressed with respect to the header, contactor plate 72 will contact second electrode 70 and plain actuator plate 154 will contact fourth electrode 170. When this situation prevails the electrical circuit is completed from the battery, through switch 122 to electric solenoid 154, through conductor 88, second electrode 70, plate contactor 72, conductor 188, fourth electrode 170, plain actuator 155 and then via ground back to the battery. Energization of this circuit actuates solenoid valve 154, allowing fluid to drain from hydraulic cylinder 132 into sump 146. This lowers the header with respect to ground and decreases angle (A) in each of the instrumented dividers until such time as contact between either contactor plate 72 separates from second electrode 70 or plain actuator plate 155 separates from electrode 170.

When the ground engaging wheel 24 of either of the instrumented dividers encounters an upgrade, the respective actuator plates 54 or 155 will move upward. Contact with either first electrode 62 or third electrode 162 will initiate an "up-header" command via electric solenoid valve 152.

The "dead-zone" between initiation of "up" and "down" command states can be adjusted by means of standoff stud 68 (See FIG. 2). Loosening the amount standoff stud 68 extends from channel support 64 will separate first and second electrodes 62 and 70 a greater distance. This will increase the "dead-zone" providing that the same adjustments are made to the standoff stud associated with the channel supports which position the third and fourth electrodes 162 and 170.

When going from one job to the next or making turnarounds, the operator can disable the automatic height control system by opening switch 122. With switch 122 open, the operator can then manually control the header height by means of control lever 120.

It will be understood that the invention is not limited to the specific embodiment disclosed in the drawings. Various modifications can be made with regard to the particular structures without limiting the scope of this invention. For example, use of all-electric servo control system is completely feasible and may be preferred in some embodiments.

We claim:

1. Automatic height control apparatus for use in a multi-row crop harvester having a crop processing header transversely mounted across its forward facing end, the header having a multiplicity of spaced apart row dividers arrayed across the front thereof, the dividers each having a frame assembly, said frame assembly being pivotally mounted to the lower forward edge of the header frame, the mounting being such that the forward tips of the dividers are able to move up and down independent of the movement of the header, said apparatus comprising:
- a ground engaging member mounted under the forward end of at least one of said dividers, said ground engaging member causing the leading edge of said member equipped divider to float up and down in response to changes in the terrain traversed by said crop harvester;
- mechanical linkage for monitoring the angular relationship between said member equipped divider and said header, said linkage including a contactor bar having its one end pivotally attached to the frame of said header and its second end arranged to move in an arcuate path in direct proportion to the up and down motion of the forward tip of said divider;
- a first electrode positioned to make contact with the second end of said contactor when the tip of said ground engaging member equipped divider is raised a prescribed amount with respect to the header, contact between said first electrode and said contactor bar being known as an up-command;
- a second electrode positioned to make contact with the second end of said contactor bar when the tip of said member equipped divider is lowered a prescribed amount with respect to the header, contact between said second electrode and said contactor bar being known as a down-command; and
- a servomechanism control system for elevational control of the crop processing header in response to the up-commands and the down-commands generated when said contactor bar makes, respectively, contact with either said first or said second electrode.

2. The invention as described in claim 1 wherein the servomechanism control system includes elevational control connections between said multi-row crop harvester and said crop processing header, said connections being drivable from said harvester for varying the height of said header with respect to ground during the harvesting operation.

3. The invention according to claim 2 wherein the elevational control means includes fluid pressure means coupled to said connections for adjusting the height of said header relative to ground, said fluid pressure means comprising a source of high pressure fluid, pressure supply lines under valve control leading to hydraulic cylinders mounted on said crop harvester, said cylinders having an operative connection with said crop harvester through which fluid adjustments into and out of said cylinders result in positional adjustments of said header with respect to ground, said valve control comprising a first electrical solenoid valve encircuited at its one terminal with the positive side of a battery having its negative side grounded, the second terminal of said solenoid valve being encircuited with said first electrode, said valve control further comprising a second electrical solenoid valve encircuited at its one terminal with the positive side of said battery and having its second terminal encircuited with said second electrode.

4. The invention according to claim 1 wherein said first and second electrodes include clamping and adjustment means for positioning and spacing said electrodes to provide a built-in dead zone between the alternate state positions of said contactor bar, said dead zone serving to prevent said servomechanism control system from continuing to hunt over the mid-range values of the height of said header with respect to ground.

5. The invention according to claim 1 wherein two of said dividers have ground engaging members mounted for rotation under the forward end thereof, each of said member equipped dividers including a set of sensors comprising said mechanical linkages, said first and second electrodes and an integrated servomechanism control system functioning to independently raise the crop header when either of said member equipped dividers generate an up-command but causing the header to be lowered only when both member equipped dividers generate a down-command simultaneously.

6. The invention according to claim 5 wherein the left-most and right-most dividers have ground engaging members.

7. The invention according to claim 1 wherein the ground engaging member is a wheel mounted for rotation on the underside of a row divider.

8. The invention according to claim 1 and including a limit chain for restricting the depression angle to which the front of the divider can drop with respect to the header.

* * * * *